United States Patent Office 3,733,414
Patented May 15, 1973

3,733,414
METHOD FOR THE CONTROL OF ACARIDS USING 3-HALOBENZAMIDES
Sidney B. Richter and Eugene F. Barnas, Chicago, Ill., assignors to Velsicol Chemical Corporation, Chicago, Ill.
No Drawing. Original application Oct. 8, 1968, Ser. No. 765,962, now Patent No. 3,649,664, dated Mar. 14, 1972. Divided and this application May 28, 1971, Ser. No. 148,198
Int. Cl. A01n 9/00, 9/20
U.S. Cl. 424—300       6 Claims

ABSTRACT OF THE DISCLOSURE

This invention discloses chemical compounds selected from the group consisting of

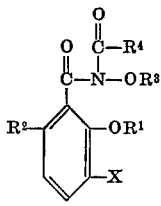

and their isomeric form

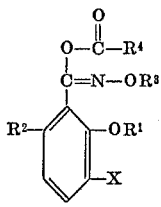

wherein X is halogen; $R^1$ and $R^3$ are alkyl; $R^2$ is selected from the group consisting of alkyl and alkoxy; $R^4$ is selected from the group consisting of alkyl, alkenyl, alkoxy, alkylthio and

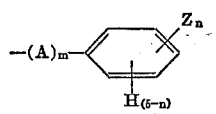

wherein A is selected from the group consisting of oxygen, sulfur and alkylene; Z is selected from the group consisting of alkyl alkenyl, alkoxy, alkylthio, halogen, nitro, cyano and dialkylamino; m is an integer from 0 to 1; and n is an integer from 0 to 5. The compounds of the above description possess valuable acaricidal properties.

---

This is a divisional of application Ser. No. 765,962, filed Oct. 8, 1968, now United States Patent No. 3,649,664 issued Mar. 14, 1972.

This invention relates to new compositions of matter and more particularly relates to new chemical compounds selected from the group consisting of and their isomeric form wherein X is halogen; $R^1$ and $R^3$ are alkyl; $R^2$ is selected from the group consisting of alkoxy and alkyl; $R^4$ is selected from the group consisting of alkyl, alkenyl, alkoxy, alkylthio and wherein A is selected from the group consisting of oxygen, sulfur and alkylene; Z is selected from the group consisting of alkyl, alkenyl, alkoxy, alkylthio, halogen, nitro, cyano and dialkylamino; m is an integer from 0 to 1; and n is an integer from 0 to 5.

In a preferred embodiment of the present invention X is selected from the group consisting of chlorine and bromine; $R^1$ and $R^3$ are lower alkyl; $R^2$ is selected from the group consisting of lower alkyl and lower alkoxy; $R^4$ is selected from the group consisting of lower alkyl, lower alkenyl, lower alkoxy, lower alkylthio and

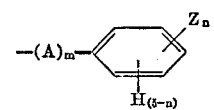

wherein A is selected from the group consisting of oxygen, sulfur and alkylene having from one to four carbon atoms; Z is selected from the group consisting of lower alkyl, lower alkenyl, lower alkoxy, lower alkylthio, chlorine, bromine, nitro, cyano and di(lower alkyl)amino; m is an integer from 0 to 1; and n is an integer from 0 to 3. The term lower as used herein designates a straight or branched carbon chain of up to about 10 carbon atoms.

The compounds of the present invention are unexpectedly useful as acaricides.

The compounds of this invention can be readily prepared from an N-alkoxybenzamide having the following general formula

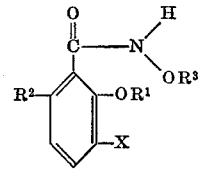

wherein X, $R^1$, $R^2$ and $R^3$ are as heretofore described, by reaction with a chloroformate or acid chloride of the formula

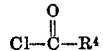

wherein $R^4$ is as heretofore described. This reaction can be readily effected in an inert organic reaction medium, such as benzene, by refluxing the reactants for a period of from about 1 to about 18 hours in the presence of an acid scavenger such as a tertiary amine. The reaction product can then be recovered by first filtering the reaction mixture to remove the acid acceptor hydrochloride which has formed, and thereafter evaporating the solvent from the filtrate to yield a mixture of the isomeric forms of the compounds of this invention. This mixture of isomers can be used as such for preparing valuable acaricidal compositions or can be separated into the individual isomers. The separation of the isomeric mixture into its two components can be effected by subjecting the product to chromatography. A suitable adsorbent for this purpose is, for example, fullers' earth, while suitable eluents are pentane and pentane-ether mixtures.

Exemplary chloroformates and acid chlorides for preparing the compounds of the present invention are methyl chloroformate, ethyl chloroformate, n-propyl chloroformate, isopropyl chloroformate, butyl chloroformate, phenyl chloroformate, 2-chlorophenyl chloroformate, 2,4-dimethylphenyl chloroformate, 3-allylphenyl chloroformate, 3-methylthiophenyl chloroformate, 4-methoxyphenyl chloroformate, 3,4-dichlorophenyl chloroformate, 4-nitrophenyl chloroformate, 3-cyanophenyl chloroformate, 2-dialkylaminophenyl chloroformate, acetyl chloride, propionyl chloride, butanoyl chloride, pentanoyl chloride, benzoyl chloride, 3,4-dibromobenzoyl chloride, phenylacetyl chloride, β-phenylpropionyl chloride, and the like.

The N-alkoxybenzamides of Formula IV can be readily prepared from the corresponding benzoyl chloride by reaction with an appropriately substituted amine or amine hydrochloride. To effect this reaction the substituted benzoyl chloride can be added, with cooling, to a mixture of the amine or amine hydrochloride and an aqueous solution of base such as potassium carbonate or potassium hydroxide. It is preferred to utilize a solvent such as benzene or chloroform in the reaction mixture. After the addition has been completed the reaction can be continued by stirring for a period of about ½ to about 7 hours. In some instances refluxing of the reaction mixture can be desirable.

The reaction product can then be isolated from the reaction mixture by separating the aqueous and organic phases, drying and filtering the organic phase, and distilling the solvent therefrom, if soluble in the solvent, or by filtering the reaction mixture if the reaction product is insoluble in the solvent. The desired product can then be used as such or can be purified by recrystallization from a suitable solvent.

The benzoyl chloride when not readily available can be prepared from a corresponding benzoic acid by common techniques such as reaction with chlorinating agents such as thionyl chloride, phosphorus pentachloride, and the like.

Suitable substituted benzoic acids for use in preparing the compounds of this invention are exemplified by 2,6-dimethoxy-3-chlorobenzoic acid,
2,6-dimethoxy-3-bromobenzoic acid,
2,6-dimethoxy-3-iodobenzoic acid,
2,6-dimethoxy-3-fluorobenzoic acid,
2,6-diethoxy-3-chlorobenzoic acid,
2-methoxy-3-chloro-6-ethoxybenzoic acid,
2-isopropoxy-3-chloro-6-methylbenzoic acid,
2-methoxy-3-bromo-6-methylbenzoic acid,
2-decyloxy-3-chloro-6-ethylbenzoic acid,
2-methoxy-3-bromo-6-isopropylbenzoic acid, and the like.

In some instances the compounds of the present invention can be prepared from the N-alkoxybenzamide of Formula IV by reaction with an acid anhydride. This procedure obviates the use of an acid scavenger and can facilitate the recovery and purification of the final product. Reaction conditions similar to those described for the use of acid chlorides or chloroformates can be employed to effect the reactions utilizing an acid anhydride.

The manner in which the compounds of the present invention can be prepared readily is illustrated in the following examples.

EXAMPLE 1

Preparation of 2,6-dimethoxy-3-chlorobenzoyl chloride 2,6-dimethoxy-3-chlorobenzoic acid (5.9 grams; 0.027 mol), toluene (12 ml.) and thionyl chloride (2.2 ml.; 0.030 mol) were charged into a 50 ml. glass reaction flask equipped with a reflux condenser with drying tube. The mixture was heated at reflux with continuous stirring for about 7 hours. After this time the reaction mixture was treated with activated charcoal and filtered. The filtrate was distilled under aspirator pressure to remove the toluene and excess thionyl chloride to give 2,6-dimethoxy-3-chlorobenzoyl chloride as the residue.

EXAMPLE 2

Preparation of N,2,6-trimethoxy-3-chlorobenzamide

Potassium carbonate (2.6 grams; 0.019 mol), methoxyamine hydrochloride (1.4 grams; 0.017 mol) and benzene (50 ml.) were placed in a 300 ml. glass reaction flask equipped with stirrer, reflux condenser and addition funnel. This mixture was cooled in an ice bath and water (5 ml.) was added followed by the slow addition of 2,6-dimethoxy - 3-chlorobenzoyl chloride (4.0 grams; 0.017 mol) prepared in Example 1. The ice bath was replaced by a heating mantle and the reaction mixture heated at reflux with continuous stirring for about 7 hours. After this time the reaction mixture was cooled and filtered. The filter-cake was triturated in hot chloroform and the triturate and filtrate were combined. The organic phase was separated from the aqueous phase, dried over magnesium sulfate, filtered and evaporated under aspirator pressure using a rotary evaporator. The residue, a white solid, was recrystallized from a toluene-chloroform-pentane mixture, washed with pentane and dried in a desiccator under vacuum to yield N,2,6-trimethoxy-3-chlorobenzamide having a melting point of 133–135° C.

EXAMPLE 3

Preparation of N,2,6-trimethoxy-N-acetyl-3-chlorobenzamide

A solution of N,2,6-trimethoxy-3-chlorobenzamide (6.0 grams; 0.024 mol) in benzene (70 ml.) was charged into a glass reaction vessel equipped with a mechanical stirrer and reflux condenser. Acetic anhydride (2.6 grams) was added and the reaction mixture was heated at reflux for a period of about 3 hours. After this time the mixture was cooled and stripped of benzene, leaving an oil as the residue. The oil was dissolved in ether and the ether solution was washed with aqueous potassium carbonate and then water. The ether solution was dried over anhydrous magnesium sulfate and was then evaporated to yield the desired product N,2,6 - trimethoxy-N-acetyl-3-chlorobenzamide as an oil.

EXAMPLE 4

Preparation of N,2,6-trimethoxy-N-isopropoxycarbonyl-3-chlorobenzamide

N,2,6 - trimethoxy-3-chlorobenzamide (10 grams; 0.04 mol), isopropyl chloroformate (5.2 grams) pyridine (3.5 grams) and benzene (250 ml.) were charged into a glass reaction flask equipped with mechanical stirrer and reflux condenser. The reaction mixture was heated at reflux for a period of about 18 hours. After this time the mixture was cooled and filtered. The filtrate was washed with aqueous potassium carbonate, dried and filtered. The dried filtrate was stripped of solvent to yield a crude oil. The oil was subjected to chromatography using fullers' earth as the adsorbent and an ether-pentane mixture (1:9) as the eluent. Sixteen fractions were collected from the column of which fractions 11 to 16 were combined and stripped of solvent to yield the desired product N,2,6-trimethoxy-N-isopropoxycarbonyl-3-chlorobenzamide,

EXAMPLE 5

Preparation of O-methyl-α-isopropoxycarbonyloxy-2,6-dimethoxy-3-chlorobenzaldoxime Fractions 5, 6 and 7 from the chromatographic separation described in Example 4 were combined, stripped of solvent and were filtered through a bed of diatomaceous earth with suction to yield O-methyl-α-isopropoxycarbonyloxy-2,6-dimethoxy-3-chlorobenzaldoxime as an oil.

EXAMPLE 6

Preparation of N,2,6-trimethoxy-N-n-propionyl-3-chlorobenzamide

N,2,6 - trimethoxy-3-chlorobenzamide (10 grams; 0.04 mol), propionyl chloride (4.4 grams) pyridine (3.9 grams) and benzene (250 ml.) were charged into a 500 ml. glass reaction flask equipped with mechanical stirrer and reflux condenser. The mixture was heated at reflux for a period of about 18 hours. After this time the reaction mixture was cooled and filtered. The filtrate was washed with aqueous potassium carbonate and water. The washed solution was dried and stripped of solvent to yield an oil. The oil was chromatographed to yield the desired product N,2,6 - trimethoxy-N-n-propionyl-3-chlorobenzamide as a viscous oil.

EXAMPLE 7

Preparation of N,2,6-trimethoxy-N-benzoyl-3-chlorobenzamide

N,2,6 - trimethoxy - 3-chlorobenzamide (13.0 grams; 0.053 mol), benzoyl chloride (7.8 grams) pyridine (4.6 grams) and benzene (280 ml.) were charged into a glass reaction flask equipped with a mechanical stirrer and reflux condenser. The reaction mixture was heated at reflux for a period of about 18 hours. After this time the reaction mixture was cooled and filtered. The filtrate was washed with aqueous potassium carbonate, dried and filtered. The dried filtrate was stripped of solvent to yield a dark viscous oil. The oil was chromatographed on fullers' earth using pentane-ether mixtures as the eluent. Thirty-eight fractions were collected. Fractions 37 and 38 were combined, were washed with aqueous potassium carbonate, dried, filtered and stripped of solvents to yield a solid product. The solid was recrystallized from a chloroform-pentane mixture to yield the desired product N,2,6-trimethoxy-N-benzoyl-3-chlorobenzamide having a melting point of 92 to 94° C.

EXAMPLE 8

Preparation of O-methyl-α-phenylcarbonyloxy-2,6-dimethoxy-3-chlorobenzaldoxime

Fractions 18 through 31 from the chromatographic separation described in Example 7 were combined and were washed with aqueous potassium carbonate. The washed solution was dried over anhydrous magnesium sulfate and was filtered. The filtrate was stripped of solvent to yield the desired product O-methyl-α-phenylcarbonyloxy-2,6-dimethoxy-3-chlorobenzaldoxime.

EXAMPLE 9

Preparation of N,2,6-trimethoxy-N-ethoxycarbonyl-3-chlorobenzamide

N,2,6-trimethoxy-3-chlorobenzamide (10 grams; 0.04 mol), ethyl chloroformate (4.6 grams), pyridine (3.5 grams) and benzene (250 ml.) were charged into a glass reaction flask equipped with stirrer and reflux condenser. The reaction mixture was heated at reflux for a period of about 18 hours. After this time the mixture was filtered, washed with aqueous potassium carbonate and dried. The dried solution was filtered and stripped of benzene to yield an oil. The oil was passed through a bed of fullers' earth and was then purified by chromatography to yield the desired product N,2,6-trimethoxy-N - ethoxycarbonyl - 3-chlorobenzamide.

EXAMPLE 10

Preparation of N,2,6-trimethoxy-N-(4'-methylphenylcarbonyl)-3-chlorobenzamide

N,2,6-trimethoxy-3-chlorobenzamide (15 grams; 0.06 mol), p-toluoyl chloride (10.2 grams), pyridine (5.4 grams) and benzene (300 ml.) were charged into a glass reaction vessel equipped with mechanical stirrer and reflux condenser. The reaction mixture was heated at reflux overnight. After this time the mixture was cooled and filtered. The filtrate was washed with aqueous sodium carbonate, dried and filtered. The dried filtrate was stripped of solvent under reduced pressure to yield a dark viscous oil. The oil was chromatographed using fullers' earth as the adsorbent and pentane-ether mixtures as the eluant. A total of 27 fractions was collected. Fractions 20 to 27 were combined, stripped of solvent under reduced pressure and recrystallized from a chloroform-pentane mixture to yield the desired product N,2,6-trimethoxy-N-(4'-methylphenylcarbonyl)-3-chlorobenzamide having a melting point of 104 to 106° C.

EXAMPLE 11

Preparation of O-methyl-α-(4'-methylphenylcarbonyloxy)-2,6-dimethoxy-3-chloro[benzamide]benzaldoxime Fractions 4 to 11 from the chromatographic separation described in Example 10 were combined, stripped of solvent and recrystallized from pentane. The resulting product was redissolved in chloroform and was washed with aqueous potassium carbonate. The washed solution was dried over magnesium sulfate, filtered and evaporated to yield a solid. The solid was then recrystallized from pentane to yield the desired product O-methyl-α-(4'-methylphenylcarbonyloxy)-2,6-dimethoxy-3-chlorobenzaldoxime having a melting point of 71.5 to 73° C.

Additional compounds within the scope of this invention can be prepared in a manner similar to that detailed in the foregoing examples. In the following examples are given the essential ingredients required to prepare the indicated named compounds by the procedures heretofore described.

EXAMPLE 12

N,2,6-trimethoxy - 3 - bromobenzamide+acryloyl chloride+triethylamine=N,2,6-trimethoxy-N - acryloyl - 3-bromobenzamide+O-methyl-α-acryloyloxy - 2,6 - dimethoxy-3-bromobenzaldoxime.

EXAMPLE 13

N-ethoxy-2-methoxy-3 - chloro - 6 - methylbenzamide +methyl chlorothioloformate+triethylamine=N-ethoxy-N-methylthiocarbonyl-2-methoxy-3-chloro-6 - methylbenzamide+O-ethyl-α-methylthiocarbonyloxy-2 - methoxy - 3-chloro-6-methylbenzaldoxime.

EXAMPLE 14

N,2-dimethoxy-3-iodo-6 - isopropylbenzamide+n - butanoyl chloride+triethylamine=N,2-dimethoxy-N-n - butanoyl-3-iodo-6-isopropylbenzamide+O-methyl-α - n - butanoyloxy-2-methoxy-3 - iodo - 6 - isopropyl[benzamide] benzaldoxime.

EXAMPLE 15

N,2-diethoxy-3-fluoro-6-methoxybenzamide+4 - chlorobenzoyl chloride+triethylamine=N,2-diethoxy - N - (4'-chlorobenzoyl)-2-fluoro-6-methoxybenzamide+O-ethyl-α-(4'-chlorobenzoyloxy)-2-ethoxy-3-fluoro-6 - methoxybenzaldoxime.

EXAMPLE 16

N-n-propoxy-2,6-dimethoxy-3-chlorobenzamide+phenyl chloroformate+triethylamine=N-n-propoxy - N - phenoxycarbonyl-2,6-dimethoxy-3 - chlorobenzamide+O - n-propyl-α-phenoxycarbonyloxy-2,6-dimethoxy - 3 - chlorobenzaldoxime.

EXAMPLE 17

N-n-decyloxy-2-n-butoxy-3-chloro - 6 - n - pentylbenzamide+phenylacetyl chloride+triethylamine=N-n-decyloxy-N-phenylacetyl-2-n-butoxy-3-chloro-6-n - pentylbenzamide+O-n-decyl-α-phenylacetyloxy-2 - n - butoxy - 3- chloro-6-n-pentylbenzaldoxime.

EXAMPLE 18

N,2,6-triethoxy-3-bromobenzamide+2-pentenoyl chloride+triethylamine=N,2,6-triethoxy-N - pentenoyl - 3- bromobenzamide+O-ethyl-α-2-pentenoyloxy - 2,6 - diethoxy-3-bromobenzaldoxime.

EXAMPLE 19

N,2-dimethoxy - 3 - chloro - 6 - pentyloxybenzamide +methacryloyl chloride+triethylamine=N,2-dimethoxy-N-methacryloyl - 3 - chloro - 6 - pentyloxybenzamide +O-methyl-α-methacryloyloxy - 2 - methoxy - 3 - chloro-6-pentyloxybenzaldoxime.

EXAMPLE 20

N,2,6-trimethoxy - 3 - chlorobenzamide+hexyl chloroformate+triethylamine=N,2,6-trimethoxy - N - hexyloxycarbonyl - 3 - chlorobenzamide+O-methyl-α-hexyloxycarbonyloxy-2,6-dimethoxy-3-chlorobenzaldoxime.

EXAMPLE 21

N,2 - di-n-decyloxy - 3 - chloro - 6 - octylbenzamide +phenyl chlorothioloformate+triethylamine=N,2-di-n-decyloxy-N-phenylthiocarbonyl - 3 - chloro - 6 - octylbenzamide+O-n-decyl - α - phenylthiocarbonyloxy - 2-decyloxy-3-chloro-6-octylbenzaldoxime.

EXAMPLE 22

N,2,6-trimethoxy - 3 - chlorobenzamide+2-bromo-4-allylbenzoyl chloride+triethylamine=N,2,6-trimethoxy-N-(2'-bromo - 4' - allylbenzoyl) - 3 - chlorobenzamide +O-methyl - α - (2'-bromo - 4' - allylbenzoyloxy)-2,6-dimethoxy-3-chlorobenzaldoxime.

EXAMPLE 23

N,6-dimethoxy-2-n-propoxy - 3 - chlorobenzamide+2-isopropyl-4-nitrobenzoyl chloride+triethylamine=N,6-dimethoxy-N-(2'-isopropyl - 4' - nitrobenzoyl)-2-n-propoxy-3-chlorobenzamide+O-methyl - α - (2'-isopropyl-4'-nitrobenzoyloxy)-2-n-propoxy - 3 - chloro[benzamide]benzaldoxime.

EXAMPLE 24

N,2,6-trimethoxy - 3 - chlorobenzamide+3-methoxy-5-methylthiobenzoyl chloride+triethylamine=N,2,6-trimethoxy-N-(3'-methoxy - 5' - methylthiobenzoyl)-3-chlorobenzamide+O-methyl - α - (3'-methoxy-5'-methylthiobenzoyloxy)-2,6-dimethoxy-3-chlorobenzaldoxime.

Further compounds within the scope of the present invention which can be prepared by the procedures detailed in the foregoing examples, but which are not intended to limit the scope of this invention, are:

N,2,6-trimethoxy-N-(3'-cyano-5'-ethylbenzoyl)-3-chlorobenzamide
O-methyl-α-(3'-cyano-5'-ethylbenzoyloxy)-2,6-dimethoxy-3-chlorobenzaldoxime
N-pentyloxy-N-(2'-dimethylamino-5'-chlorobenzoyl)-2-isopropoxy-3-chloro-6-ethylbenzamide
O-pentyl-α-(2'-dimethylamino-5'-chlorobenzoyloxy)-2-isopropoxy-3-chloro-6-ethylbenzaldoxime
N,2-dimethoxy-N-n-pentanoyl-3-chloro-6-n-butyl benzamide
O-methyl-α-n-pentanoyloxy-2-methoxy-3-chloro-6-n-butylbenzaldoxime
N-isopropoxy-N-n-butoxycarbonyl-2,6-dimethoxy-3-chlorobenzamide
O-isopropyl-α-n-butoxycarbonyloxy-2,6-dimethoxy-3-chlorobenzaldoxime
N-n-butoxy-N-n-pentylthiocarbonyl-2-ethoxy-3-bromo-6-methylbenzamide
O-n-butyl-N-n-pentylthiocarbonyloxy-2-ethoxy-3-bromo 6-methylbenzaldoxime
N-methoxy-N-(2'-chloro-4'-di-n-propylaminophenylacetyl)-2-n-pentyloxy-3-chloro-6-ethoxybenzamide
O-methyl-α-(2'-chloro-4'-di-n-propylaminophenylacetyl)-2-n-pentyloxy-3-chloro-6-ethoxybenzaldoxime
N,2,6-trimethoxy-N-[γ-(2',4'-dichlorophenyl)-butanoyl]-3-chlorobenzamide
O-methyl-α-[4-(2',4'-dichlorophenyl)-butanoyloxy]-2,6-dimethoxy-3-chlorobenzaldoxime Many economically important species of mites and ticks can be controlled by the compounds of the present invention such as the red spider mite, the two-spotted spider mite, the strawberry spider mite, the citrus rust mite, the cattle tick, the poultry mite, the citrus red mite and the European red mite.

For practical use as acaricides, the compounds of this invention are generally incorporated into acaricidal compositions which comprise an inert carrier and an acaricidally toxic amount of such a compound. Such acaricidal compositions, which can also be called formulations, enable the active compound to be applied conveniently to the site of the acarid infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of acaricides can be dispersed under superatmospheric pressure as aerosols. However, preferred liquid acaricidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the acarid infestation. The emulsifiers most commonly used in these concentrates are nonionic or mixtures of nonionic with anionic surface-active agents.

A typical acaricidal composition according to this invention is illustrated by the following example, in which the quantities are in parts by weight.

EXAMPLE 25

Preparation of a dust

Product of Example 3 _____ 10
Powdered talc _____ 90

The above ingredients are mixed in a mechanical grinder-blender and are ground until a homogeneous, free-flowing dust of the desired particle size is obtained. This dust is suitable for direct application to the site of the acarid infestation.

The compounds of this invention can be applied as acaricides in any manner recognized by the art. One method for destroying acarids comprises applying to the locus of the acarid infestation, an acaricidal composition comprising an inert carrier and, as an essential active ingredient, in a quantity which is toxic to said acarids, a compound of the present invention. The concentration of the new compounds of this invention in the acaricidal compositions will vary greatly with the type of formulation and the purpose for which it is designed, but generally the acaricidal compositions will comprise from about 0.05 to about 95 percent by weight of the active compounds of this invention. In a preferred embodiment of this invention, the acaricidal compositions will comprise from about 5 to 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with insecticides in the compositions heretofore described. These insecticides can comprise from about 5% to about 95% of the active ingredients in the compositions. Use of the combinations of these insecticides with the compounds of the present invention provide insecticidal and acaricidal compositions which are more effective in controlling insects and acarids and often provide results unattainable with separate compositions of the individual compounds. The insecticides with which the compounds of this invention can be used in the acaricidal compositions to control insects as well as acarids include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbophenothion, phorate, zinophos, diazinon, malathion, mevinphos, dimethoate, DBD, ronnel, oxydemeton-methyl, dicapthon, chlorothion, phosphamidon, naled; fenthion, trichlorofon, DDVP, and the like; organic nitrogen compounds such as dinitro-o-cresol, dinitrocyclohexylphenol, DNB, DNP, binapacril, azobenzene, and the like; organic carbamate compounds such as carbaryl, ortho 5353, and the like; organic sulfur compounds such as phenothiazine, phenoxathin, lauryl thiocyanate, [bis(2-thiocyanoethyl)ether], isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene, and the like.

The compounds of the present invention can also be combined with fungicidal and nematocidal chemical compounds to form pesticidal compositions useful for the control of fungi and in some cases soil nematodes as well as acarids. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate, and the like; while examples of nematocidal compounds are chloropicrin, O,O-diethyl O-(2,4-dichlorophenyl) phosphorothioate, tetrachlorothiophene, dazomet, dibromochloropropane, and the like.

The new compounds of this invention can be used in many ways for the control of acarids. Acaricides which are to be used as stomach poisons or protective materials can be applied to the surface on which the acarids feed or travel. Acaricides which are to be used as contact poisons or eradicants can be applied directly to the body of the acarid, as a residual treatment to the surface on which the acarid may walk or crawl, or as a fumigant treatment of the air which the acarid breathes. In some cases, the compounds applied to the soil or plant surfaces are taken up by the plant, and the acarids are poisoned systemically.

The quantity of active compound of this invention to be used for acarid control will depend on a variety of factors, such as the specific acarid involved, intensity of the infestation, weather, type of environment, type of formulation, and the like. For example, the application of only one or two ounces of active chemical per acre may be adequate for control of a light infestation of an acarid under conditions unfavorable for its feeding, while a pound or more of active compound per acre may be required for the control of a heavy infestation of acarids under conditions favorable to their development.

The utility of compounds of the present invention as acaricides was demonstrated in various experiments carried out for the control of the two-spotted spider mite (*Tetranychus urticae*).

In one such experiment, wherein the systemic activity of the compounds of this invention was demonstrated, 5 day old Henderson bush lima bean plants are each watered with 30 ml. of a formulation containing the test compound at the indicated concentrations. After a period of 48 hours the plants were infested with two-spotted spider mites and were placed in a holding room and supplied with water and light as required. After a period of 5 days the mortality of the mites was observed and rated on a percent basis in comparison to untreated controls. The results of this experiment are shown in Table I.

TABLE I

| Test compound | Concentration of test compound in p.p.m. | Percent mortality |
| --- | --- | --- |
| Product of Example: | | |
| 3 | 100 | 89 |
| 4 | 100 | 92 |
| 4 | 80 | 94 |
| 4 | 40 | 85 |
| 5 | 100 | 94 |
| 5 | 80 | 100 |
| 5 | 40 | 73 |
| 7 | 100 | 100 |
| 7 | 80 | 100 |
| 7 | 40 | 100 |
| 11 | 100 | 100 |

In another experiment wherein the activity of the compounds of the present invention as contact poisons was determined, the test compounds were formulated at the indicated dosages, as aqueous emulsions of acetone solutions and were sprayed onto Henderson bush lima bean plants, each infested with about 100 adult two-spotted spider mites. The treated plants were then placed into a holding room and were supplied with their daily requirement of water and light. After a period of 5 days the mortality of the mites is determined and is rated on a percentage basis in comparison to untreated controls. The results of this experiment are shown in Table II.

TABLE II

| Test compound | Concentration of test compound in p.p.m. | Percent mortality |
| --- | --- | --- |
| Product of Example: | | |
| 3 | 3,500 | 100 |
| 3 | 1,000 | 100 |
| 4 | 3,500 | 100 |
| 4 | 1,000 | 100 |
| 5 | 3,500 | 100 |
| 5 | 100 | 97 |
| 5 | 10 | 72 |
| 9 | 3,500 | 100 |
| 9 | 1,000 | 100 |
| 11 | 3,500 | 96 |

We claim:
1. An acaricidal composition comprising an inert carrier and, an acaricidally effective amount of a compound of the formula

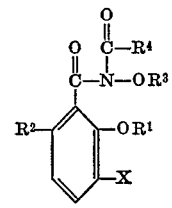

wherein X is halogen; $R^1$ and $R^3$ are lower alkyl; $R^2$ is selected from the group consisting of lower alkyl and lower alkoxy; $R^4$ is selected from the group consisting of lower alkyl, lower alkenyl, lower alkoxy, lower alkylthio, and

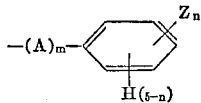

wherein A is selected from the group consisting of oxygen, sulfur, and alkylene, having from one to four carbon atoms; Z is selected from the group consisting of lower alkyl, lower alkenyl, lower alkoxy, lower alkylthio, halogen, nitro, cyano, and di(loweralkyl)amino; $m$ is an integer from 0 to 1; $n$ is an integer from 0 to 3.

2. A method for the control of acarids which comprises applying to the locus of said acarids an acaricidally effective amount of the composition of claim 1.

3. A method of claim 2 wherein the essential compound is N,2,6-trimethoxy-N-acetyl-3-chlorobenzamide.

4. A method of claim 2 wherein the essential compound is N,2,6-trimethoxy-N-isopropoxycarbonyl-3-chlorobenzamide.

5. A method of claim 2 wherein the essential compound is N,2,6-trimethoxy-N-n-propionyl-3-chlorobenzamide.

6. A method of claim 2 wherein the essential compound is N,2,6-trimethoxyl-N - benzoyl - 3 - chlorobenzamide.

References Cited
UNITED STATES PATENTS

| | | | |
|---|---|---|---|
| 2,394,916 | 2/1946 | Jones | 71—115 |
| 2,577,969 | 12/1951 | Jones | 71—118 |
| 3,236,871 | 2/1966 | Hinman et al. | 260—453 |
| 3,371,106 | 2/1968 | Berliner et al. | 71—118 |
| 3,439,018 | 4/1969 | Brookes et al. | 260—453 |
| 3,450,747 | 6/1969 | Smith et al. | 260—455 |
| 3,474,124 | 10/1969 | Berliner et al. | 260—453 |
| 3,485,865 | 12/1969 | Richter et al. | 260—453 |
| 2,412,510 | 12/1946 | Jones | 71—118 |

JEROME V. GOLDBERG, Primary Examiner

A. J. ROBINSON, Assistant Examiner

U.S. Cl. X.R.

424—298, 304, 324